Oct. 30, 1962   I. G. DUNCAN   3,060,572
CUTTING HEAD FOR A DRY SHAVER
Filed Sept. 23, 1960   2 Sheets-Sheet 1

INVENTOR
IAN GAIR DUNCAN
By Hane and Nydick
ATTORNEYS

Oct. 30, 1962  I. G. DUNCAN  3,060,572
CUTTING HEAD FOR A DRY SHAVER
Filed Sept. 23, 1960  2 Sheets-Sheet 2

INVENTOR
IAN GAIR DUNCAN
By Hane and Nydick
ATTORNEYS

United States Patent Office 3,060,572
Patented Oct. 30, 1962

3,060,572
CUTTING HEAD FOR A DRY SHAVER
Ian Gair Duncan, London, England, assignor to Ever-Ready Razor Products Limited
Filed Sept. 23, 1960, Ser. No. 57,924
Claims priority, application Great Britain Sept. 23, 1959
1 Claim. (Cl. 30—43)

This invention relates to dry shavers and provides an improved construction of the cutting head of such a device.

The invention is concerned with cutting heads comprising an apertured shear plate and a reciprocable inner cutter having a plurality of cutting edges which extend transversely to the direction of reciprocation, these cutting edges being held against the inner face of the shear plate. The cutting edges may be (and preferably are) formed by separate plates or blades set into slots in a frame structure which also forms part of the inner cutter, as described and claimed in the specification of prior British Letters Patent No. 788,305, while the shear plate may be (and preferably is) a very thin flexible metal sheet or foil supported in arched condition over the reciprocable inner cutter, which is resiliently pressed against it.

In accordance with the present invention the cutting edges of the inner cutter are given an undulated, zig-zag, or otherwise corrugated form. This allows the cutting edges to be formed by plates or blades which have a lesser thickness than the minimum which is satisfactory when the cutting edges are straight, as in the construction of British Patent No. 788,305. A reduction in the thickness of the blades is advantageous in that it reduces the area of contact between the reciprocating cutter and the stationary shear plate, so that the frictional resistance to movement of the cutter and the total spring force applied between the cutter and the shear plate can be reduced, while maintaining the same pressure loading between the cutting edges and the shear plate. Excessively thin blades would be insufficiently rigid and liable to vibration: the corrugation of the blades stiffens them and allows them to be reduced in thickness.

A further advantage of using cutting edges that are corrugated (instead of straight and parallel to the rows of holes in the shear plate foil, as described in British Patent No. 788,305) is that different parts of the same cutting edge register at different times and not simultaneously with a transverse row of holes in the foil. This is of particular advantage when the portions of the shear plate immediately surrounding the holes are depressed inwardly relative to the general level of the inner surface of the shear plate, only these depressed rim portions of the foil making contact with the reciprocating cutting edges, with consequent reduction in friction and the heat generated thereby. With corrugated cutting edges it can very easily be arranged by suitably dimensioning the parts that in all positions of reciprocation of the inner cutter each of the cutting edges thereof is in contact with the projecting rims of the surface of the shear plate at a plurality of positions along the length of the cutting edge, thus providing a "lead" for the remainder of that cutting edge.

A particular embodiment of the invention is illustrated in the accompanying drawing and described below by way of example only. In the drawing.

Figure 1:
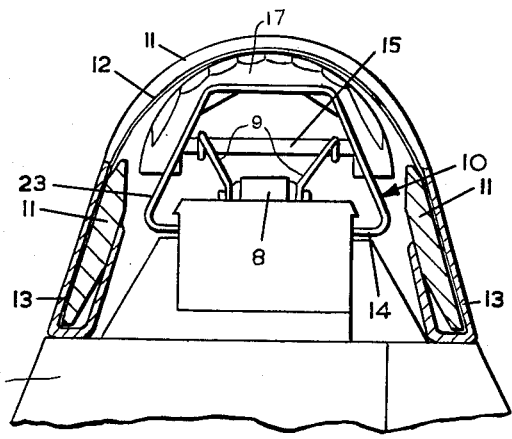
FIGURE 1 is an end view partly in section of a dry shaver incorporating a cutting head in accordance with the invention.

Referring to the drawing and initially to FIGURE 1 thereof, the dry shaver illustrated comprises a main casing 7 which accommodates an electric motor for imparting oscillating movement to a driving member 8. The member 8 is coupled by a spring 9 to the inner cutter, indicated generally by the reference 10, oscillation of member 8 causing the cutter to reciprocate in a direction perpendicular to the plane of FIGURE 1. A head frame 11, removably secured by means not shown to the casing 7, carries the outer shear plate 12 which is constituted by a flexible metal whose opposite longitudinal edges are secured by spring clips 13 to the head frame 11, the intermediate, unsecured part of the shear plate 12 being thus held flexed in arched condition over the inner cutter 10. The inner cutter 10 is retained to the casing in a manner which permits the cutter to move inwardly and outwardly (i.e. vertically in FIGURE 1) over a limited range, and the coupling spring 9 serves also to hold the cutter pressed outwardly against the inner surface of the shear plate.

Figure 2:
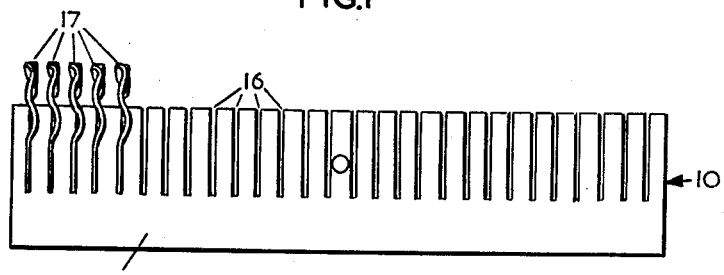
FIGURE 2 is side view of the reciprocable inner cutter of the shaver, only a few of the blades being shown in position.

The reciprocable inner cutter 10, shown separately in FIGURE 2, comprises a sheet metal frame 23 of inverted channel section having inturned flanges 14 (FIGURE 1), which engage in grooves in the main casing 7 and retain the cutter to the casing against the action of spring 9 when the head frame carrying the outer shear plate 12 is removed for cleaning or other purposes. A pin 15 extending transversely of the frame 23 serves for the engagement of the coupling spring 9. The frame 23 is formed with a plurality of transverse slots 16, and in each of these slots there is adhesively secured a blade 17 of arcuate form, only a few of the blades being shown in position in FIGURE 2. The curved outer edges of the blades 17, which are spaced apart in the direction of reciprocation of the cutter 10 and extend transversely to that direction, are accurately ground to lie on a common cylindrical surface and it is these blade edges which engage the inner surface of the shear plate and effect the cutting action.

Figure 3:
FIGURE 3 is a plan view of a single blade.
Figure 4:
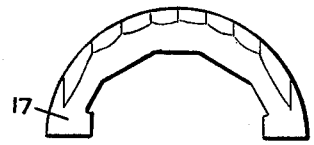
FIGURE 4 is an elevation of the blade.
Figure 5:
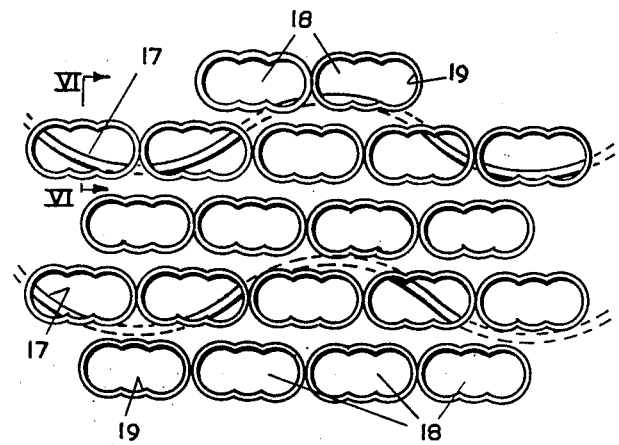
FIGURE 5 is a fragmentary plan view on a larger scale of part of the apertured shear plate and some of the blades of the inner cutter.
Figure 6:
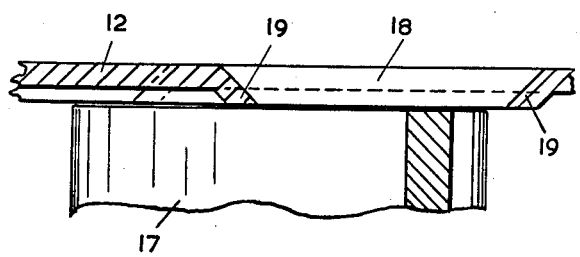
FIGURE 6 is a sectional view on a still larger scale taken on the line VI—VI of FIGURE 5.

Instead of being plane, as in the cutter construction of British Patent No. 788,305, each of the blades 17 (one of which is shown separately in FIGURES 3 and 4) has the entire or preferably the marginal portion which provides the cutting edge corrugated or undulated, so as to be displaced alternately to opposite sides of the general plane of the blade. The amplitude of the corrugations and the distance between successive crests may vary widely, but the dimensioning selected for the particular construction illustrated will be apparent from the drawing and in particular from FIGURE 5. This figure shows a part of two adjacent blades 17 and the overlying part of the outer shear plate or foil 12, which is formed with parallel transversely extending rows of perforations 18, each having the form of three intersecting circles. The material of the shear plate 12 is depressed inwardly around the margin of each hole, as indicated at 19. As clearly shown in FIGURE 6, it is only with these depressed rim portions 19 of the shear plate 12 that the cutting edges of the blades 17 make contact. As will be clear from FIGURE 5, each blade is at any one instant (that is, at any given position of reciprocation of the cutter 10) in contact with depressed rim portions 19 of the shear plate at a plurality of positions along its length, parts of the cutting edge intermediate these positions being held spaced from the inner surface of the shear plate.

I claim:

In a cutting head for a dry shaver, a rectilinearly reciprocable cutter frame formed with a plurality of parallel slots disposed in planes transverse to the direction of reciprocation, a plurality of sheet metal cutter blades each having an inner portion received in one of said slots and fixedly secured to the frame and an outer portion projecting beyond the frame, the outer edges of all the blades lying on a common cylindrical surface, the outer marginal portion of each blade adjacent the outer edge thereof being undulated so as to be displaced alternately to opposite sides of the general plane of the blade, a thin flexible metal shear plate having a plurality of hair receiving apertures therein supported in cylindrically arched condition over the cutter blades, and means resiliently urging the cutter frame towards the shear plate to engage the undulated edges of the cutter blades with the inner surface of the shear plate.

References Cited in the file of this patent

UNITED STATES PATENTS

| | | |
|---|---|---|
| 2,055,517 | Branstetter | Sept. 29, 1936 |
| 2,223,768 | Martin | Dec. 3, 1940 |
| 2,273,685 | Berg | Feb. 17, 1942 |
| 2,281,841 | Holsclaw | May 5, 1942 |
| 2,296,134 | Wright | Sept. 15, 1942 |
| 2,701,414 | Knapp | Feb. 8, 1955 |
| 2,929,139 | Van Haaften | Mar. 22, 1960 |